United States Patent [19]

Foster et al.

[11] Patent Number: 4,665,510
[45] Date of Patent: May 12, 1987

[54] METHOD FOR ATTENUATING MULTIPLES IN CDP DATA GATHERS

[75] Inventors: Robert K. Foster, Carrollton; Gerald W. Tait, Dallas, both of Tex.

[73] Assignee: Mobil Oil Corporation, New York, N.Y.

[21] Appl. No.: 730,928

[22] Filed: May 6, 1985

[51] Int. Cl.[4] .............................................. G01V 1/36
[52] U.S. Cl. ...................................... 367/21; 367/24; 367/38; 367/43; 364/421
[58] Field of Search ....................... 367/21, 24, 38, 43; 364/421

[56] References Cited

U.S. PATENT DOCUMENTS

| | | | |
|---|---|---|---|
| 3,512,127 | 5/1970 | Burg | 367/24 |
| 3,581,274 | 5/1971 | Ruehle | 367/43 |
| 3,629,800 | 12/1971 | Schneider | 367/24 |
| 3,705,382 | 12/1972 | Quay | 367/24 |
| 4,380,059 | 4/1983 | Ruehle | 367/24 |

OTHER PUBLICATIONS

"Processing System Designed to Aid Predictive Deconvolution in Degrading the Intermediate Period Marine Multiples," Weber et al., 49th Annual SEG Mtg. (New Orleans, 11/4/79) Preprint #5-54.

Primary Examiner—Thomas H. Tarcza
Assistant Examiner—Ian J. Lobo
Attorney, Agent, or Firm—Alexander J. McKillop; Michael G. Gilman; Charles J. Speciale

[57] ABSTRACT

A method for attenuating multiples in common depth point data whereby common depth point data is received and spike deconvolution maybe performed on the data. The data is constant velocity stacked and gap deconvolution is performed. The primary stack velocity is determined and all data having a velocity other than the primary stack velocity is muted. All scans within the constant velocity stack are composited. These composites are arranged in proper order and displayed.

3 Claims, 14 Drawing Figures

METHOD FOR ATTENUATING MULTIPLES IN CDP DATA GATHERS

BACKGROUND OF THE INVENTION

A consistent problem encountered in seismic data interpretation is that of "multiples". When acoustic seismic energy is generated, it travels though the earth subsurface until it encounters an interface created by a density and/or velocity change in subsurface formations. The interface will reflect a portion of the acoustic seismic energy, refract another portion and permit a portion to pass through the interface. Seismic energy which has been reflected more than once from the interface is termed a "multiple". It is desirable to attenuate these reflections so that the primary reflected acoustic energy is evident from which an approximation of the subsurface formations can be implied. Normally, this data is collected in common depth point (CDP) gathers and processed to develop an approximation of the subsurface formations in a given area.

Figure 1:
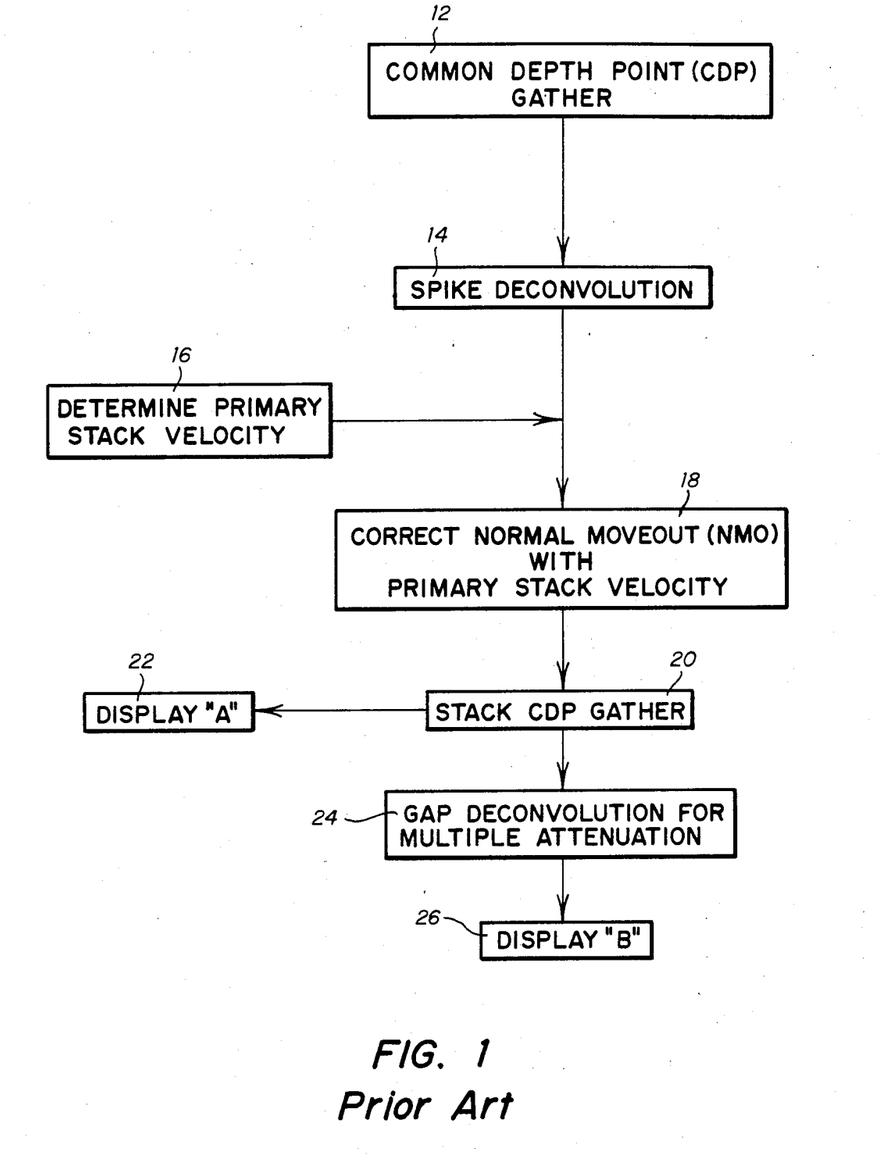
FIG. 1 is a flow chart of a conventional data processing method.

A conventional way to process CDP data, as illustrated in FIG. 1, is to collect the data at block 12, apply a spike deconvolution operator at block 14, determine the primary stack velocity at block 16, correct normal moveout (NMO) with the primary stack velocity at block 18, stack the common depth point data at block 20 and display it as display "A" at block 22. A possible addition is to apply a gap deconvolution operator at block 24 to the stacked data before displaying the stacked section at block 26.

Figure 2:
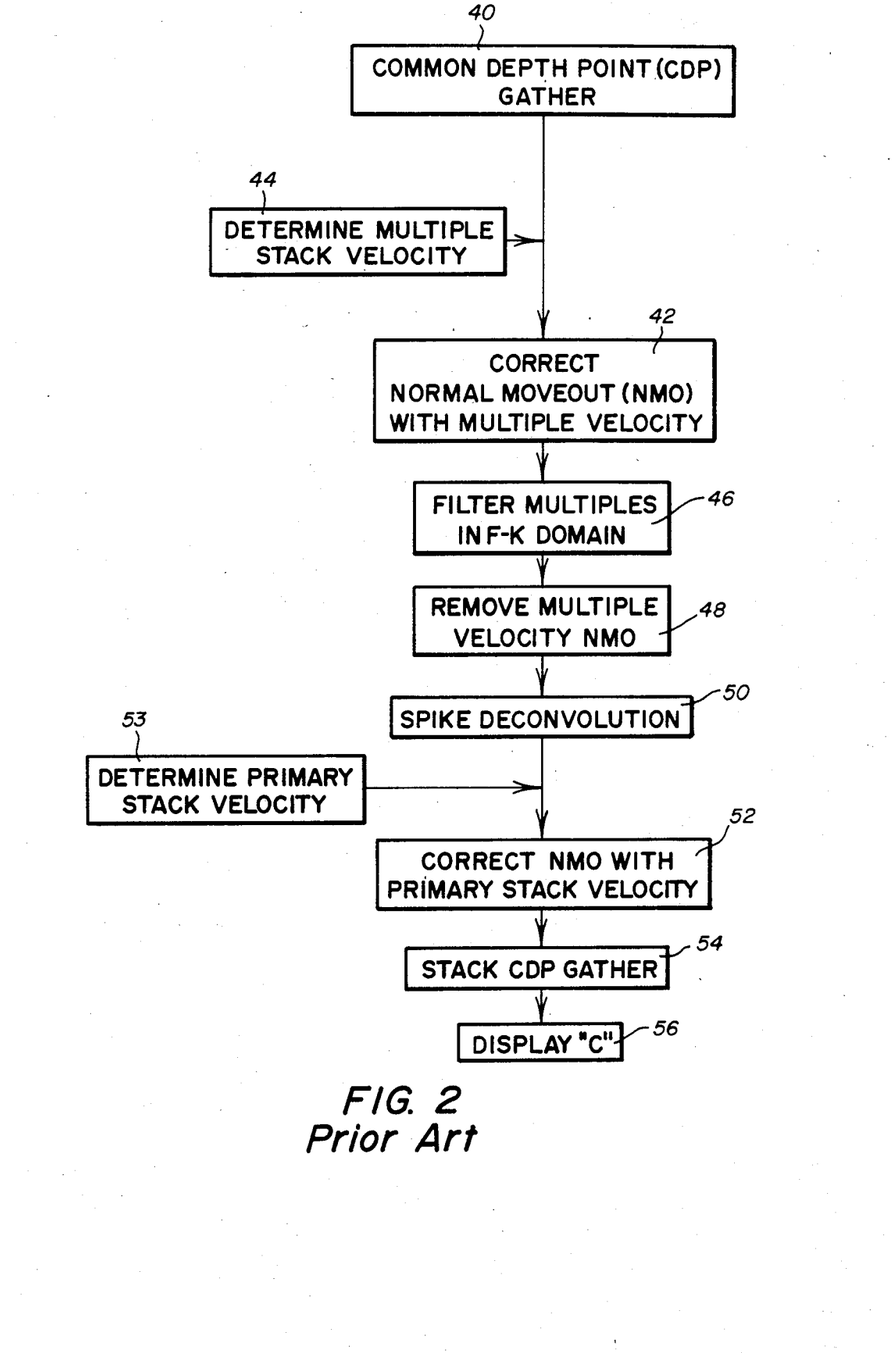
FIG. 2 is a flow chart of an F-K filtering method for processing seismic data.

This conventional method for processing CDP data provides satisfactory results in most cases but has problems when significant long period multiples are present with either a short offset distance or approximately equivalent travel velocities in adjacent formations. When these conditions occur, a process using F-K domain filtering of data prior to stack is used, as illustrated in FIG. 2. Common Depth Point data is received at block 40 and is normal moveout corrected with multiple velocity at block 42 after the multiple stack velocity is determined at block 44. The multiples are filtered in the F-K domain at block 46 and multiple velocity normal moveout is removed at block 48. A spike deconvolution operator is applied at block 50 and the normal moveout is corrected with the primary stack velocity at block 52, the primary stack velocity having been determined at block 53. The common depth point gather is stacked at block 54 and displayed as display "C" at block 56 of FIG. 2. However, this procedure is expensive and may quadruple the cost of processing data.

SUMMARY OF THE INVENTION

The present invention provides a method for attenuating long period multiples. Common depth point data is constant velocity stacked. A gap deconvolution operator is applied to the stacked data, and the primary stack velocity is determined. All data except the primary stack data is muted and all velocity scans within the constant velocity stack are composited. The composites are arranged in order and displayed.

DESCRIPTION OF THE PREFERRED EMBODIMENT

Figure 3:
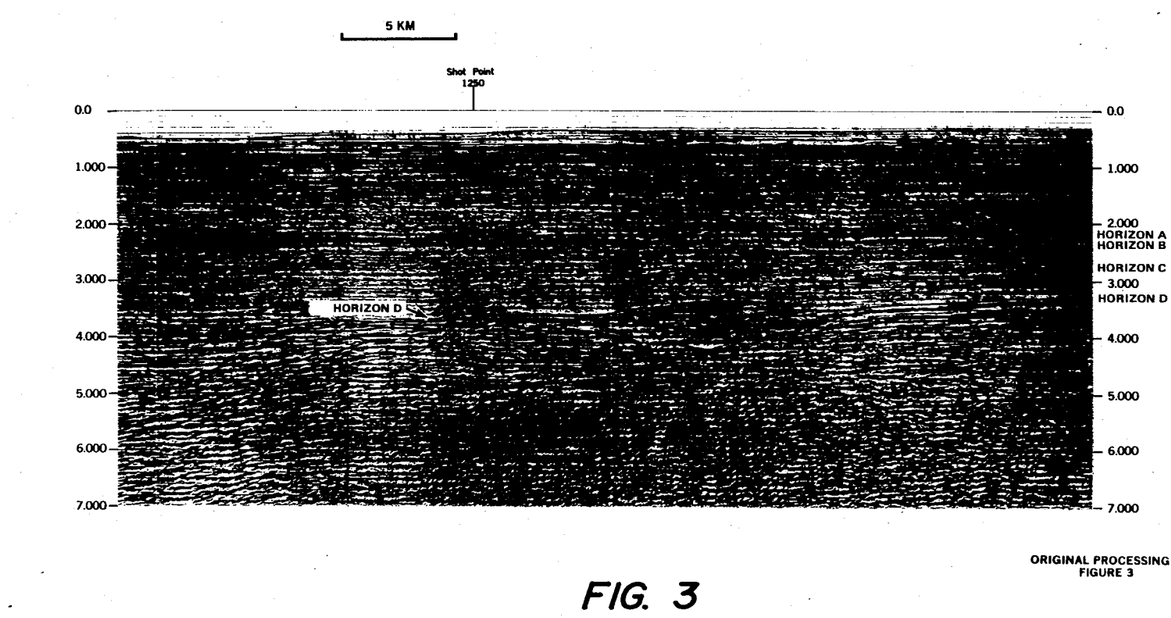
FIG. 3 is a processed seismic section.

The original processed section is seen in FIG. 3. The horizon D reflection at a line of 3.650 seconds near shot point 1250 shows an uncommon loss of amplitude and this reflection, as well as the horizon B section above, exhibits a loss of reflection continuity. These conditions are thought to be caused by the presence of dispersed gas in the section.

The processor used predictive deconvolution before and after stack and parameter selections showed that long period multiples were recognized as a problem. Deconvolution before stack has an active filter length of 280 milliseconds with a 20 millisecond prediction gap while deconvolution after stack had an active length of 300 milliseconds with a variable predictive gap equal to the two-way time to sea bed less 150 milliseconds. This combination resulted in deconvolution operator length of approximately 500 milliseconds over the zone of interest. Regardless of this long deconvolution operator, significant amounts of multiple energy remain which hamper interpretation of these data.

Figure 4A:
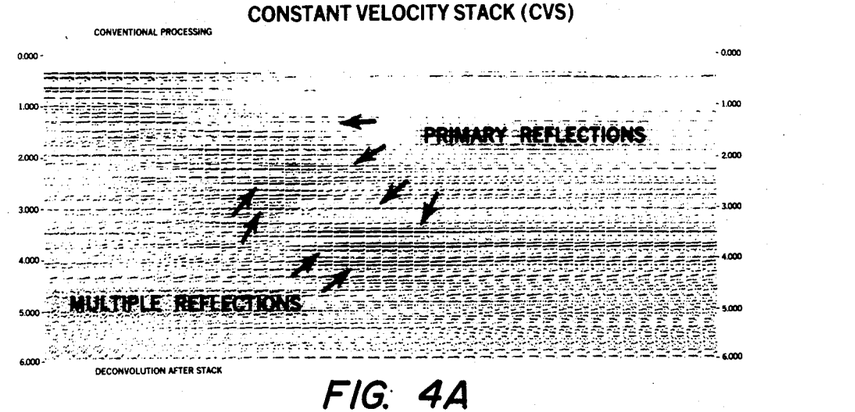
FIGS. 4a–4c are constant velocity stacks for conventional processing, deconvolution after stack and F-K filtered before stack.

As a first step to reprocessing the data, Constant Velocity Stacks were generated from Common Depth Point gathers that had been deconvolved with a spiking operator of 250 milliseconds. The results are seen in FIG. 4a as conventional Processing. The dominant energy seen here arises from the long period water bottom multiple. The multiple is repeated up to three times following primary reflections. With this degree of interference, it is difficult to pick accurate stack velocities.

Figure 6A:
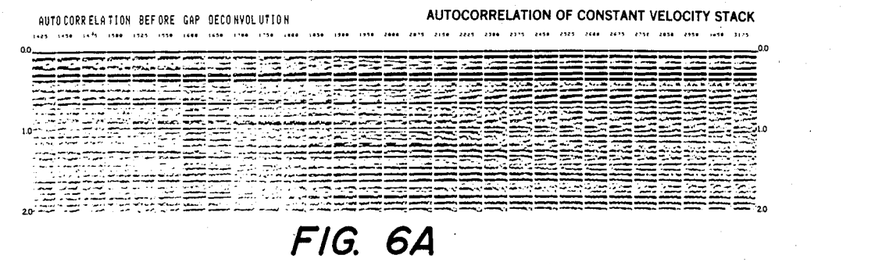
FIG. 6 illustrates the autocorrelation of constant velocity stacks.
Figure 6B:
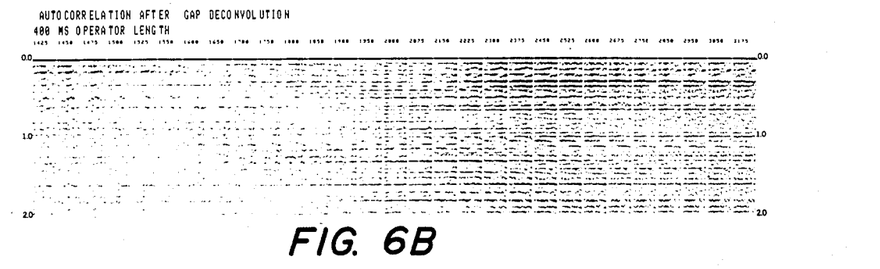
Figure 6C:
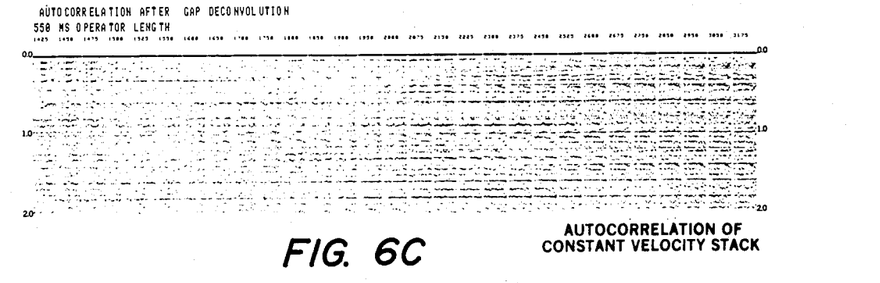

To reduce the multiple interference, the previously generated Constant Velocity Stacks were deconvoluted with a predictive operator. Deconvolution after stack is commonly used on seismic sections but is rarely applied to data in the Constant Velocity Stack mode. Predictive deconvolution parameters included a second zero crossing gap with a total operator length of 550 milliseconds. Support for these parameters is seen in FIG. 6, Autocorrelation of Constant Velocity Stacks. The long period water bottom multiples were effectively attenuated when the operator length reached 550 milliseconds.

Figure 4B:
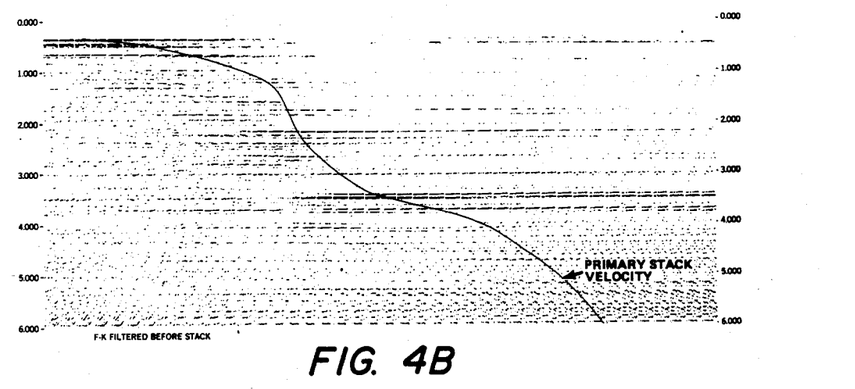

Results from this technique are seen on the Deconvolution After Stack in FIG. 4b. Good multiple attenuation was attained, and it was possible to pick reliable stack velocities. The quality of the data was improved enough to assume that the velocity information was correct and would be used with confidence for analysis as well as processing.

Constant Velocity Stacks were generated to provide 100% coverage over the zone of primary interest from shot point 1086 to shot point 3070. This dense spacing was selected to determine if small velocity anomalies existed that could be related to the presence of gas.

The only lateral velocity changes seen were gradational in the zone of interest. At a time of 3.4 seconds, a maximum difference of 6 % was observed in the stacking velocities. Differences of this magnitude are not associated with significant accumulations of gas. Gas may be dispersed in the section to the extent that it changes the reflectivity of seismic horizons but is not present in sufficient quantities that it appreciably modifies the stacking velocities.

When filtering multiples prior to stack in the F-K domain, it is desirable to select multiple stack velocities that are high enough to include all multiple reflections but low enough to exclude primary reflections. Generally, this is a difficult task because multiple and primary reflections are not clearly separated. This is evident on the conventional Processing Constant Velocity Stack of FIG. 4a. The Deconvolution After Stack, however, emphasizes the primary reflections with their stack velocity ranges, and this information can aid in selecting a good multiple stack velocity. The lower end of these velocity ranges determines the upper velocity limits for stacking multiples.

Using these facts as a selection criteria, multiple stack velocities were determined by comparing the two Constants Velocity Stacks. Following this procedure, it was found that the multiple stack velocity could be approximated as a percentage of the primary stack velocity. Empirically, the multiple stack velocity could approach 92% of the primary stack velocity without degrading the primary reflection. The multiple stack velocities calculated from this relationship were used to normal moveout correct the Common Depth Point gathers.

The corrected gathers were filtered in the F-K domain to remove the multiple reflections. All data that was flat or undercorrected was considered to be multiple energy and was rejected. The overcorrected data was retained as it represented the primary reflections. On completion of filtering, the multiple velocity normal moveout was removed leaving Common Depth Point gathers in their original state, except that they were largely multiple free.

Figure 4C:
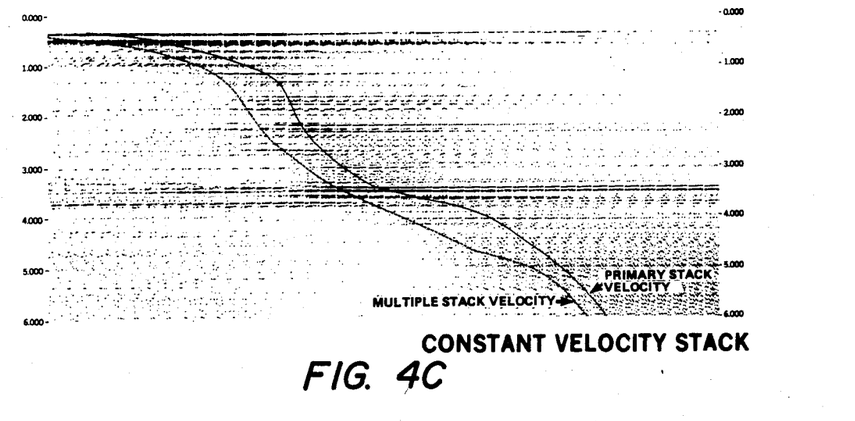

After applying a 250 millisecond spike deconvolution operator, a Constant Velocity Stack of the F-K Filtered Stack was generated and is shown in FIG. 4c. The absence of reflections to the left of the dashed Multiple Stack Velocity line demonstrates that multiples were effectively attenuated leaving the primary reflections to the right with much of their original character. These results show that with proper selection of multiple stack velocites, F-K filtering can separate multiple and primary reflections. This is possible even if their stack velocities are nearly the same, e.g., in this case, an 8 percent difference.

As indicated, a stacking velocity function was picked from each gap deconvolved Constant Velocity Stack. These functions were used on all of the stacking procedures so that velocities for each seismic cross-section were the same.

Figure 5:
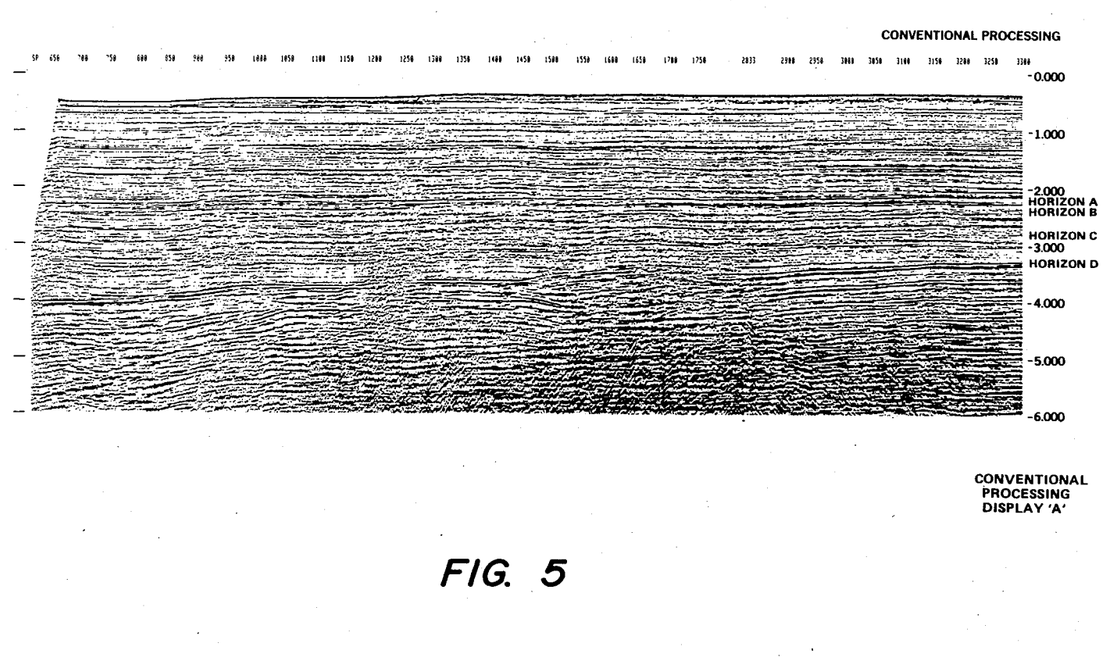
FIG. 5 is a seismic section resulting as display "A" from the method of FIG. 1.

Display "A" of FIG. 1 is illustrated in FIG. 5 Conventional Processing was processed with a spike deconvolution operator of 250 millisecond length applied before stack. This is the same operator used on the conventionally processed Constant Velocity Stack.

The long period multiples have not been attenuated except through the miss-stack of events caused by the differential moveout between primary and multiple reflections. The moveout difference is insufficient to reduce the multiple energy enough to produce an acceptable seismic section.

Figure 7:
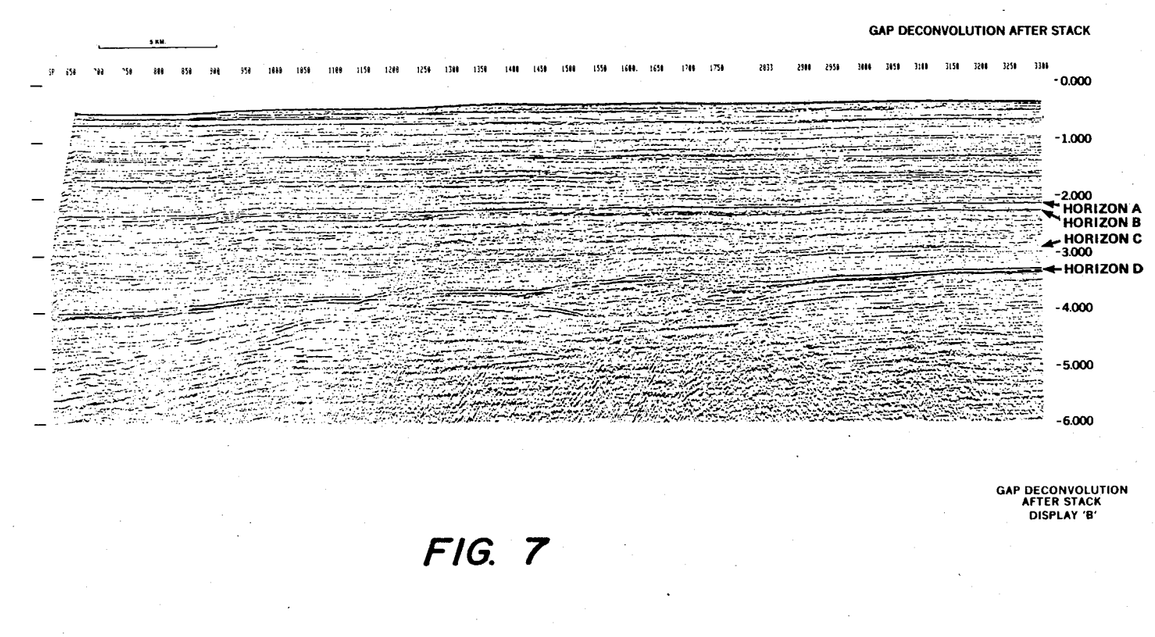
FIG. 7 is a seismic section resulting from display "B" from an alternate method of FIG. 1.

Display "B" of FIG. 1 is illustrated in FIG. 7, Gap Deconvolution After Stack was processed with a predictive deconvolution operator applied to the spike deconvolved stacked section. The total operator length was 550 milliseconds including a second zero crossing gap. This is the same operator that was applied to the Deconvolution After Stack Constant Velocity Stack.

High amplitude events such as horizon D and horizon A showed little change from the previous section. There was a decrease in multiple energy but some of the weaker reflections, such as the horizon C unconformity, are still not clearly defined because of residual multiple interference.

Figure 8:
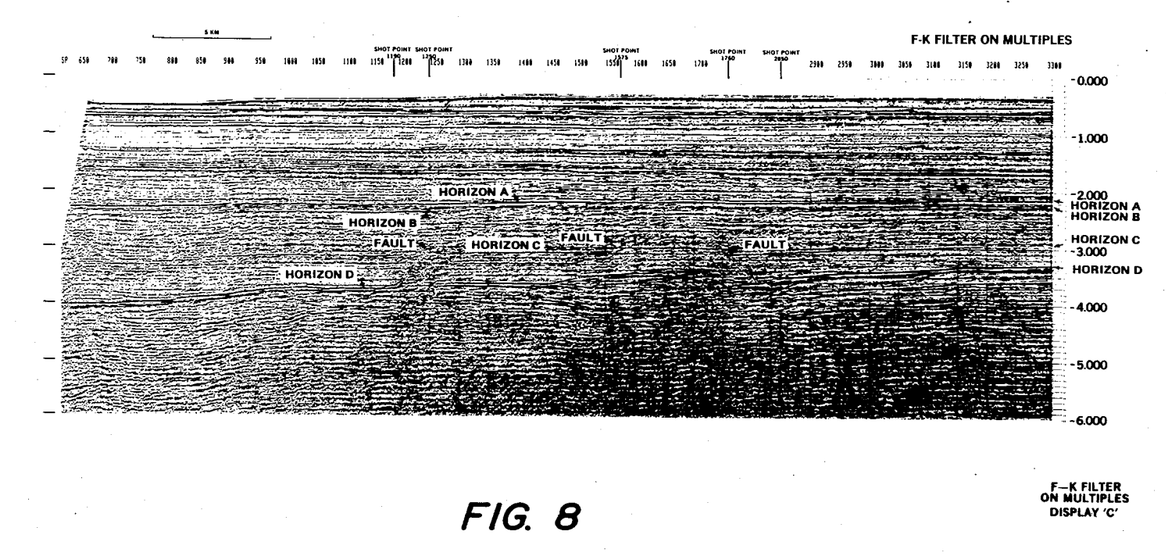
FIG. 8 is a seismic section resulting from the method of FIG. 2.

The section illustrated in FIG. 8 shows the result of using F-K domain filtering of multiple energy of Display "C" of FIG. 2. The multiple energy has been greatly attenuated as was expected from the results seen on the Constant Velocity Stack. Better detail is evident on this section than was present on the previous displays. Specific observations relevant to the interpretation of this data are as follows. First, the amplitude of horizon D is more variable than originally thought. The poor reflectivity seen at shot point 1250 is not unique, but is present at scattered locations all the way to shot point 2850. Lack of reflectivity shows on unstacked data and, therefore, is not due to a discernable miss-stack of the common depth point data but appears to be associated with a decrease in the difference of the acoustic impedances at the reflecting horizon. Second, attenuation of multiple energy reveals that there are faults cutting the low amplitude horizon C unconformity near shot points 1250, 1575, and 1760. With this information, it appears that a horst-like feature exists between shot points 1575 and 1760. Third, horizon B appears consistent across the section except for the interval from shot point 1250 to shot point 2900 where it is poorly defined. There is a loss of amplitude and continuity in this zone. Fourth, the horizon A reflection is continuous throughout the section with relatively constant amplitude.

As discussed previously, Constant Velocity Stacks had been gathered continuously for velocity analysis. The gap deconvolution version of these stacks showed a degree of multiple suppression that approached the results attained by F-K filtering the multiples before stack. This was apparent on FIGS. 4b and 4c. The primary reflections were obvious, and it was possible to pick a good primary stack velocity for each Constant Velocity Stack. It seemed evident that if the reflections centered about the primary velocity were extracted from the stack, aligned vertically, and arranged in order, this would constitute a seismic section that contained the best attributes of all Constant Velocity Stacks. This procedure was followed resulting in Display "D"-Constant Velocity Stack Composite. The details of the technique follow.

Figure 9:
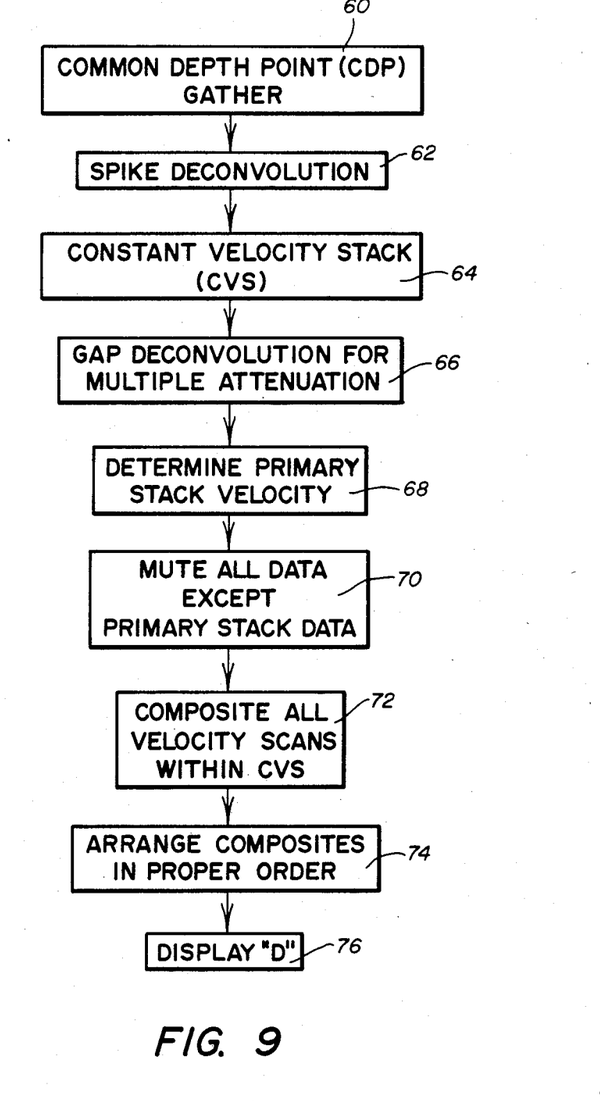
FIG. 9 is a flow chart of an improved method for processing, CDP data.

Referring now to FIG. 9, the method of the present invention is illustrated in flow diagram form. Common Depth Point data gathers are received at block 60. The data gathers may be processed with a spike deconvolution operator at block 62, although any suitable processing may be used or eliminated entirely, if desired. Constant velocity stacks are performed at block 64. The constant velocity stacked data is processed with a gap deconvolution operator at block 66 to attenuate long period multiples. The primary stack velocity is determined at block 68. At block 70, all data except primary stack data is muted. All velocity scans within the constant velocity stack are composited at block 72. All composites are arranged in a sequential order or any appropriate order at block 74. At block 76, the data is displayed as Display "D".

On each of the Constant Velocity Stacks, all data was muted except for the two-to-three velocity scans centered about the stack velocity. The number of velocity scans included were based on the manner in which the Constant Velocity Stacks were formatted. The velocity for each scan was selected so that the difference between successive scans was less than four percent. Generally, with this detail, best stacking velocities are limited to two or three velocity scans where differences are difficult to see. Because differences between the scans are small, compositing the scans is not a major problem to this technique.

With the muting completed, the primary reflections were composited into a trace sequential data set by vertically stacking the velocity scans from each constant velocity stack. The data sets were then gathered in order of shot point number to produce the final stack section. Display "D" of block 76 in FIG. 9.

Figure 10:
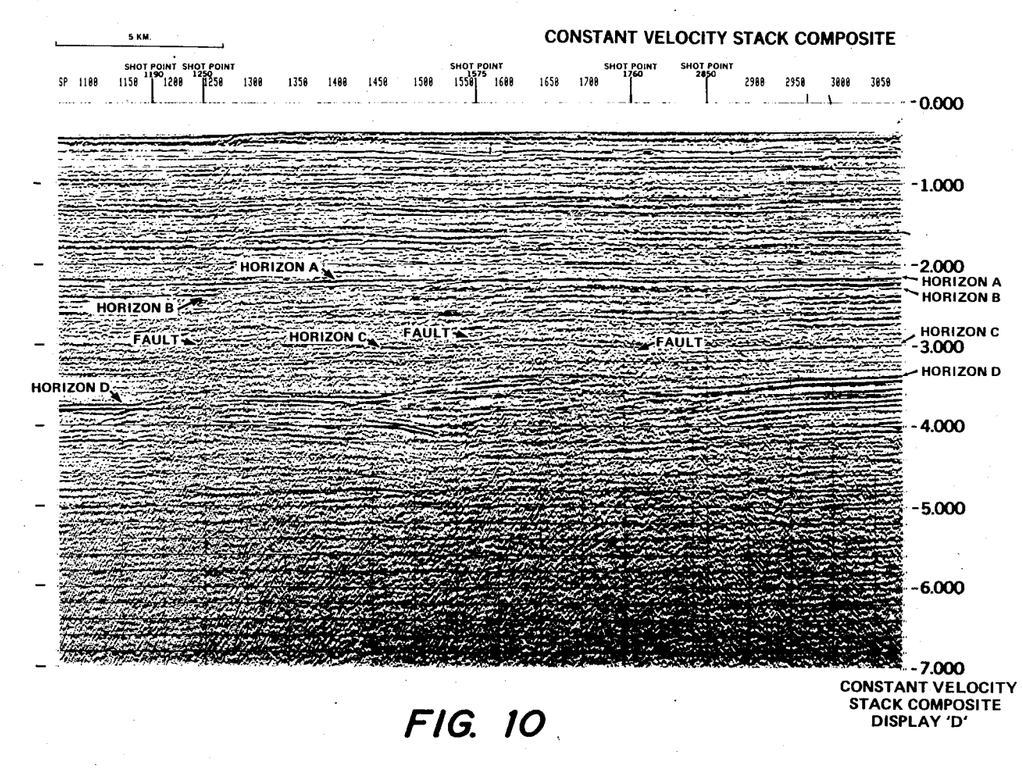
FIG. 10 is a seismic section resulting from the method of FIG. 9.

Results of this processing, illustrated as FIG. 10, show essentially the same detail that was obtained from the F-K domain filtered section, illustrated in FIG. 8. The quality is nearly as good and the section is easier to produce and much less expensive.

Computer and manpower costs for this procedure are in the same range as that for the conventional deconvolution after stack. A cost comparison of the two methods depends on the number of constant velocity stacks required to process the data. If continuous velocity information is needed to stack the data, the composite method is cheaper by 10 dollars per kilometer. For one velocity analysis per kilometer, the costs are the same. Using one velocity analysis for every two kilometers, the composite is more expensive by 10 dollars per kilometer and for three kilometers by 15 dollars per kilometer.

To F-K filter the multiple prior to stack, the cost is approximtely 150 dollars per kilometer more than either of the other methods. Additionally, manpower costs are higher because multiple stack velocities have to be interpreted and digitized.

We claim:

1. A method for attenuating multiples, comprising the steps of:

receiving common depth point gather data;

performing a spike deconvolution operation on said data;

stacking said spike deconvolved data with constant velocity as a stacking parameter;

performing a gap deconvolution operation on said stacked data;

determining the primary stack velocity of said data;

muting all data other than data having said primary stack velocity;

compositing all velocity scans within the constant, velocity stack;

arranging said composites in a predetermined order; and displaying said arranged composites.

2. A method for attenuating multiples comprising the steps of:

receiving a common depth point data gather;

constant velocity stacking said data gather;

filtering said stacked data with a gap deconvolution operator;

determining the primary stack velocity;

muting all data except primary stack data;

compositing all velocity scans within said constant velocity stack;

arranging said composites in sequential order; and displaying said arranged composites.

3. The method according to claim 2 also including the steps of processing said common depth point data gather before constant velocity stacking said data gather.

* * * * *